US012115685B2

(12) United States Patent
Ha et al.

(10) Patent No.: US 12,115,685 B2
(45) Date of Patent: Oct. 15, 2024

(54) FAST AND ROBUST INITIALIZATION METHOD FOR FEATURE-BASED MONOCULAR VISUAL SLAM USING INERTIAL ODOMETRY ASSISTANCE

(71) Applicant: Midea Group Co., Ltd., Foshan (CN)

(72) Inventors: Thanh Huy Ha, Milpitas, CA (US); Yi Chen, San Jose, CA (US); Zhicai Ou, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 368 days.

(21) Appl. No.: 17/305,655

(22) Filed: Jul. 12, 2021

(65) Prior Publication Data

US 2023/0010105 A1    Jan. 12, 2023

(51) Int. Cl.
  *B25J 9/16*    (2006.01)
  *B25J 13/08*    (2006.01)
  *G06T 7/579*    (2017.01)

(52) U.S. Cl.
  CPC ............. *B25J 9/1697* (2013.01); *B25J 9/162* (2013.01); *B25J 9/1653* (2013.01); *B25J 9/1664* (2013.01); *B25J 9/1679* (2013.01); *B25J 13/088* (2013.01); *G06T 7/579* (2017.01)

(58) Field of Classification Search
  CPC ........ B25J 9/1697; B25J 9/162; B25J 9/1653; B25J 9/1664; B25J 9/1679; B25J 13/088; G06T 7/579; G01C 21/383

USPC ........................................................ 382/153
See application file for complete search history.

(56) References Cited

U.S. PATENT DOCUMENTS

| 11,274,929 | B1 * | 3/2022 | Afrouzi ................ G01C 21/165 |
| 11,774,983 | B1 * | 10/2023 | Zhang .................. G05D 1/0272 |
| | | | 701/28 |
| 2017/0136626 | A1 * | 5/2017 | Wang ....................... B25J 9/1697 |
| 2020/0005469 | A1 * | 1/2020 | Daniilidis .............. H04N 5/147 |
| 2020/0273190 | A1 * | 8/2020 | Ye ............................ G06T 7/579 |

* cited by examiner

*Primary Examiner* — Nancy Bitar
*Assistant Examiner* — Heath E. Wells
(74) *Attorney, Agent, or Firm* — Morgan, Lewis & Bockius LLP

(57) ABSTRACT

A method and system for capturing, by a camera a sequence of frames at respective locations within a portion of an environment; capturing, by an inertial measurement unit, a sequence of inertial odometry data corresponding to the sequence of frames at the respective locations; storing in a queue a data record includes information extracted from processing the respective frame and information from the inertial measurement unit; in accordance with a determination that the sequence of inertial odometry data satisfies a first criterion: calculating a first relative pose between the first frame and the second frame; and in accordance with a determination that a difference between the first relative pose and the information extracted from processing the respective frame satisfy a first threshold: generating an initial map of the portion of the environment based on the first data record and the second data record.

16 Claims, 12 Drawing Sheets

| | ORB-SLAM2 (L) | M1 | ORB-SLAM2 (S) | M2 |
|---|---|---|---|---|
| Init time (sec) | 10.7 | 0.38 | 9.3 | 0.39 |
| Init success rate (%) | 92% | 100% | 97% | 100% |

FAST AND ROBUST INITIALIZATION METHOD FOR FEATURE-BASED MONOCULAR VISUAL SLAM USING INERTIAL ODOMETRY ASSISTANCE

FIELD OF THE TECHNOLOGY

The present disclosure generally relates to the technology of simultaneous localization and mapping (SLAM) in an environment, and in particular, to systems and methods for generating an initial map for a mobile robot with respect to its environment using image data.

BACKGROUND OF THE TECHNOLOGY

Localization, place recognition, and environment understanding are key capabilities to enable a mobile robot to become a fully autonomous or semi-autonomous system in an environment. Simultaneous localization and mapping (SLAM) is a method that builds a map of an environment and simultaneously estimates the pose of a mobile robot (e.g., using the estimated pose of a camera) in the environment. SLAM algorithms allow the mobile robot to map out unknown environments and localize itself in the environment to carry out tasks such as path planning and obstacle avoidance.

SUMMARY

Loosely coupled and tightly coupled methods form two different approaches to integrate Visual Simultaneous localization and mapping (VSLAM) with an Inertial Measurement Unit (IMU). The loosely coupled approach may be suitable for low-cost systems because of its simplicity, ease of debugging, and also uses much less computational resources. In some embodiments, the loosely coupled approach uses Extended Kalman Filter to fuse camera poses predicted from VSLAM (e.g., poses derived from Visual Odometry poses or "VO poses") with those measured from the IMU (e.g., Inertial Odometry poses or "IO poses"). Prior to fusing the IO poses with the VO poses, the loosely coupled approach requests VSLAM to initialize and create an initial map of the environment. The quality of this initial map in the initialization step may significantly impact the robustness and accuracy of the localization and mapping processes later on.

Due to a lack of initial data (e.g., for the initialization step) and the adverse impact of unfriendly motion (e.g. shaking, turning, etc.) of the robot on image quality, VSLAM systems may suffer from high failure rates (e.g., unable to successfully initialize and create an initial map) and experience initialization delays that may be up to tens of seconds.

Feature-based Monocular VSLAM (FM-VSLAM), a type of VSLAM systems, shares the same issue. The initialization difficulties for FM-VSLAM may be even more severe because FM-VSLAM uses only a single camera to reconstruct 3D scenes.

Initialization algorithms in FM-VSLAM are therefore more complex and more sensitive to image quality and environment. In addition, FM-VSLAMs may use complex heuristic algorithms for initialization. For example, ORB-VSLAM 2, first estimates Fundamental and Essential matrices, and employs RANSAC scheme to mitigate outliers. It then uses a heuristic method that includes parameters that are tuned depending on different environments, to select a matching model (either Fundamental or Essential), before going through a heavy heuristic flow to resolve ambiguities.

The methods and systems described herein alleviate issues relating to the heuristic nature of FM-VSLAM and ORB-VSLAM 2 methods that may make them difficult to use, especially in industrial products, which do not permit frequent tuning of parameters for each environment. Moreover, the extensive use of RANSAC scheme in ORB-VSLAM 2 may result in random initialization results when the environment is not rich of features.

The initial maps generated by the methods and systems described herein are less affected by unfriendly motions of the robot. The methods and systems are simpler, lighter weight, less heuristic, and deterministic (e.g., completely deterministic). The methods described herein consistently outperformed ORB-VSLAM2 by a large margin in various tests.

The methods and systems described herein first use the IMU to detect friendly motion of the robot and only triggers the VO initialization algorithm if friendly motion is detected. Such a screening process helps to better ensure that the initial map, once generated, will be less affected by unfriendly motions of the robot. Errors in SLAM systems are accumulated. If unfriendly motion happens during the initial mapping process, the keyframes' poses will be inaccurately computed, and therefore affects the subsequent pose estimation and building of keyframes. On the other hand, if the initial map is generated without unfriendly motion, the subsequent pose estimation for new frames and keyframe selection will have a good reference (e.g., like an anchor). For example, for an initial map that already has a large error at the beginning, more errors are added nonlinearly to the initial map during the robot's operation and at a certain point, the error may become large enough to cause the robot to lose its able to track between frames even without unfriendly motion. For a good initial map (e.g., accurate, low-error map), the map built after the initialization process would also have lower errors. And if severe unfriendly motions occur afterwards and cause the robot to lose its tracking, the system has a higher likelihood of recovering itself from the tracking loss (e.g. by triggering a relocalization procedure that can use the previous good data to help recover the robot's tracking).

The methods and systems described herein do not include RANSAC based Fundamental and Essential matrix fitting (unlike ORB-VSLAM2) and are lighter weight and deterministic (e.g., totally deterministic). The methods and systems also do not involve resolving ambiguities of the matching model and therefore minimize parameter tuning.

The methods and systems described herein differ from other loosely coupled methods that also use an IMU in that IO poses are provided as input at the initialization step to assist with the VO initialization process. The methods and systems described herein also differ from tightly coupled initialization methods. In tightly coupled initialization methods, optimization is called for every frame. In contrast, for the methods and systems described herein, optimization in the form of Global Bundle Adjustment (GBA) is used only once, after the VO initialization is deemed to have succeeded and thus involves much less computational resource.

According to a first aspect of the present application, a method of initializing a mobile robot includes: capturing, by a camera moving in an environment, a sequence of frames at respective locations within a portion of the environment, the sequence of frames includes a first frame and a second frame; capturing, by an inertial measurement unit, a sequence of inertial odometry data corresponding to the sequence of frames at the respective locations; storing in a queue, for each respective frame in the sequence of frames, a data record comprising information extracted from processing the respective frame and information from the inertial measurement unit; in accordance with a determination that the sequence of inertial odometry data satisfies a first criterion: calculating a first relative pose between the first frame and the second frame; and in accordance with a determination that a difference between the first relative pose and the information extracted from processing the respective frame satisfy a first threshold: generating an initial map of the portion of the environment based on the first data record and the second data record.

In some embodiments, the first relative pose between the first frame and the second frame is calculated based on inertial odometry data corresponding to the first frame and the second frame in the sequence of inertial odometry data. In some embodiments, the camera and the inertia measurement unit are mounted to a robot and determining whether the sequence of inertial odometry data satisfies a first criterion includes determining if the robot is moving along a trajectory that is conducive to generating the initial map. In some embodiments, the trajectory that is conducive to generating the initial map comprises a straight line. In some embodiments, the first criterion is satisfied when a straight line fit of the sequence of inertial odometry data has a least square fitting error that is smaller than a threshold. In some embodiments, the sequence of inertial odometry data for the straight line fit spans a duration corresponding to a first time window, and the queue having a same number of entries as a number of data points within the first time window. In some embodiments, the method further includes optimizing via a global bundle adjustment using the sequence of inertial odometry data as an initial pose for the global bundle adjustment, prior to generating the initial map.

In some embodiments, the difference between the first relative pose and the information extracted from processing the respective frame comprises a consistency check between key points extracted from the second frame, and a transformation of key points from the first frame based on the first relative pose.

According to a second aspect of the present application, an electronic device includes one or more processors, memory and a plurality of programs stored in the memory. The programs include instructions, which when executed by the one or more processors, cause the electronic device to perform the methods described herein.

According to a third aspect of the present application, a non-transitory computer readable storage medium stores a plurality of programs for execution by an electronic apparatus having one or more processors. The programs include instructions, which when executed by the one or more processors, cause the electronic device to perform the methods described herein.

In addition to reducing computation complexity, and improving speed and accuracy of localization of mobile robots in an environment, as described above, various additional advantages of the disclosed technical solutions are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 2C shows example performance metrics, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1A:
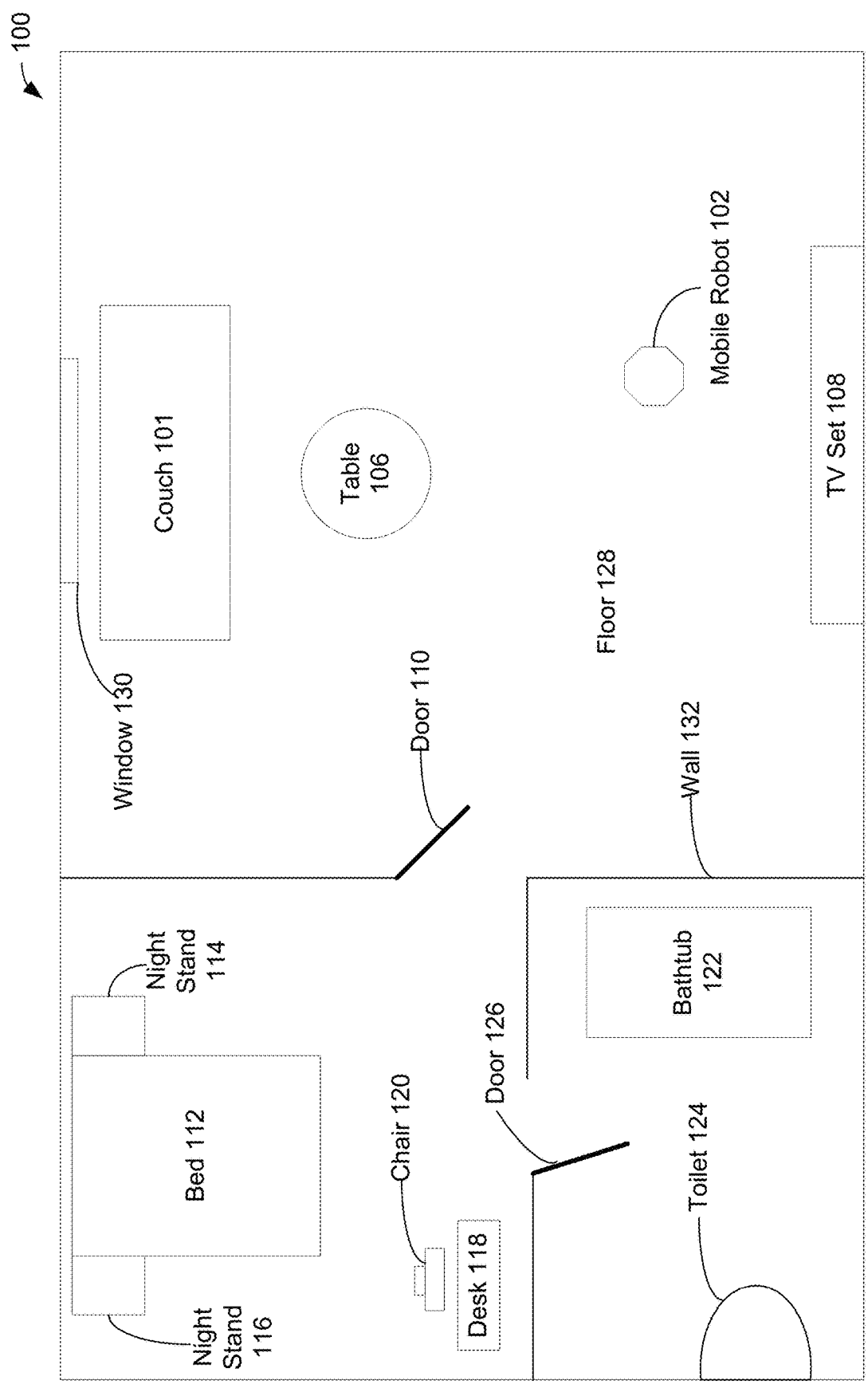
FIG. 1A is a schematic diagram of a layout of an environment in which a mobile robot navigates in accordance with some embodiments.

FIG. 1A is a schematic diagram of a layout of an exemplary environment 100 in which a mobile robot navigates in accordance with some embodiments. In FIG. 1, for example, the environment 100 is an indoor environment including a number of connected rooms separated by walls. The environment 100 includes both structural objects (e.g., window 130, floor 128, doors 110 and 126, and wall 132) and non-structural objects (e.g., couch 101, table 106, TV set 108, bed 112, night stands 114 and 116, chair 120, desk 118, toilet 124, and bathtub 122). In some embodiments, the environment 100 is an outdoor environment, and optionally includes both structural objects (e.g., buildings, landmarks, streets, etc.) and non-structural objects (e.g., trees, mailboxes, street signs, cars, picnic tables, tents, etc.). In some embodiments, the environment 100 (or portions of the environment 100) is digitally captured (e.g., by RGB color cameras, black and white cameras, infrared cameras, depth cameras, etc.) and the structural and non-structural objects are detected and identified as semantic objects from the captured images using various image processing and object segmentation and/or recognition methods. For example, the semantic annotation of the objects can be achieved using algorithms for pixel-level 2D semantic segmentation (e.g., deep neural networks). Each of the semantic objects includes one or more semantic annotations and descriptors, such as categorical labels, appearance descriptors, shape descriptors, size attributes, material attributes, 3D position and orientation, etc. For example, the semantic object representing the chair 120 captured on an image of a portion of the environment 100 may include the following semantic annotations and descriptors:

TABLE 1

Semantic Annotation and Descriptors for a Chair Object

| | |
|---|---|
| Object ID | 001 |
| Object Type | Chair |
| Group ID | Living room |
| Type | Static |
| Affordance | Movable |
| Functionality | Sitting |
| Attributes | Wood, upholstered, multiple legs |
| Appearance | Heavy, medium size |
| Position on image | (8, 2.5, 0), distribution N (0.2, 0.2, 0.2) |
| 3D bounding box | (0.8, 0.8, 0.5), orientation (0, 0, 0) |

In some embodiments, a mobile robot 102 (e.g., an autonomous or semi-autonomous cleaning device, delivery device, transportation device, surveillance device, etc.) navigates in the environment (e.g., on the floor 128 in the environment 100) to perform preprogrammed tasks (e.g., vacuuming/mopping the floor, performing security checks, delivering food items or medication, and/or traveling to a charging station or user-selected destination, etc.). In some embodiments, the mobile robot has onboard processing capability to process images, and uses the object semantic information to self-localize in the environment. In some embodiments, the mobile robot includes communication equipment to communication with a host device (e.g., a control station, a home station, a remote server, etc.) to transmit image data to and receive localization results from the host device. In some embodiments, the mobile robot 102 is equipped with both a front view camera (e.g., forward facing) and a top view camera (upward facing) to capture images at different perspectives in the environment 100. In some embodiments, the mobile robot 102 is further equipped with rear view camera, and/or downward view camera to capture images from different perspectives in the environment 100. In some embodiments, the mobile robot 102 sends the captured images to an onboard computer (e.g., or a remote computer via wireless connection) to extract object semantic information for localization purpose (e.g., computing the robot or the robot's camera's pose in the environment 100). In some embodiments, the mobile robot retrieves information needed for localization from a host device, as needed. In some embodiments, some or all of the steps described with respect to the mobile robot can be performed by a host device in communication with the mobile robot. The localization process based on object semantic information will be discussed in more detail below.

A monocular feature-based VSLAM system uses a single camera to gradually build a map of an unknown area through which the VSLAM system is traveling through, and localizes itself in this map. Initialization of the VSLAM system includes building an initial map of the unknown area at the beginning. Quality of the initialization greatly affect the quality and accuracy of the subsequent mapping and localization of the VSLAM system.

Convention ways of initializing a monocular feature-based VSLAM system may be challenging, and may take tens of seconds. When the initialization is of a bad quality, the VSLAM system may need to be reinitialized. Sometimes the initialization process may be unstable such that for the same scene, some initialization processes succeed while some initialization processes fail. The initialization process may also be very heuristic, involving many parameters that have to be tuned. While inertial measurement units (IMUs) may be used to assist VSLAM initialization, some techniques such as tightly coupled visual inertial odometry methods may be computationally expensive, complex and hard to debug. The methods and systems described herein provide a fast, robust, and lightweight initialization of the VSLAM system.

Figure 1B:
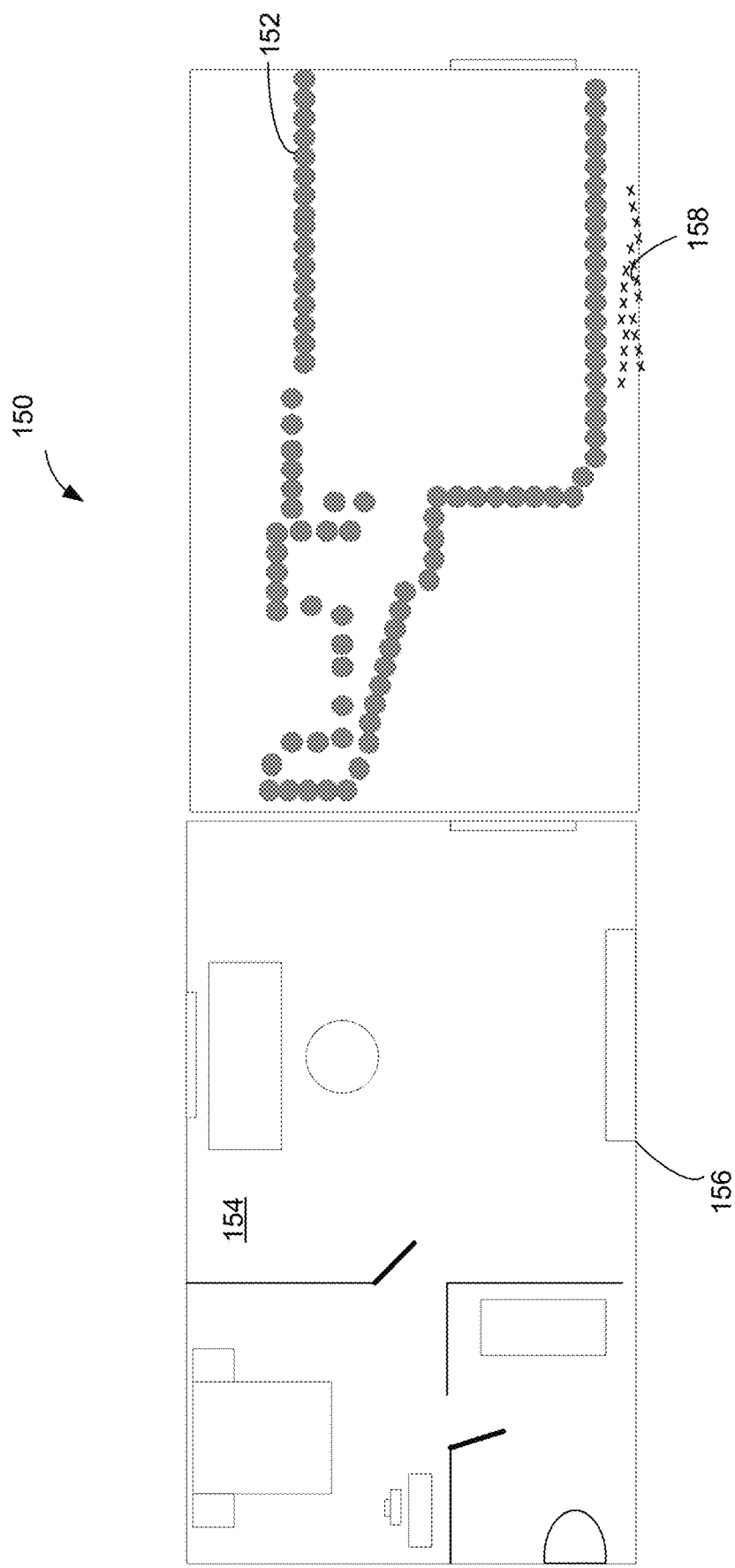
FIG. 1B shows an example of a mobile robot being initialized, in accordance with some embodiments.

FIG. 1B shows an example of a mobile robot being initialized, in accordance with some embodiments. An example 150 shows measured data associated with a mobile robot traveling in an environment (e.g., a room) having a layout 154. The room includes wall feature 156. The mobile robot travels along a trajectory 152, and the measured data shows a number of data points 158 that correspond to the wall feature 156. FIG. 2B shows an example image frame marked with extracted key points, in accordance with some embodiments. The data points 158 in FIG. 1B correspond to the dots in FIG. 2B.

A monocular camera captures images from the scene, and key points (e.g., as shown by the dots in FIG. 2B) are extracted from each image frame using feature extraction. Key points are then tracked between frames (e.g., keypoint 221 and keypoint 222). In FIG. 2B, a key point 222 corresponds to a corner of a door 220. As long as the key point 222 associated with the corner of the door 220 can be tracked in subsequent frames, localization of mobile robot is considered to be functional or successful. When the key point 222 cannot be tracked in subsequent frames, the VSLAM system of the mobile robot has to be reset and re-initialized (e.g., initialization is considered unsuccessful).

Figure 2A:
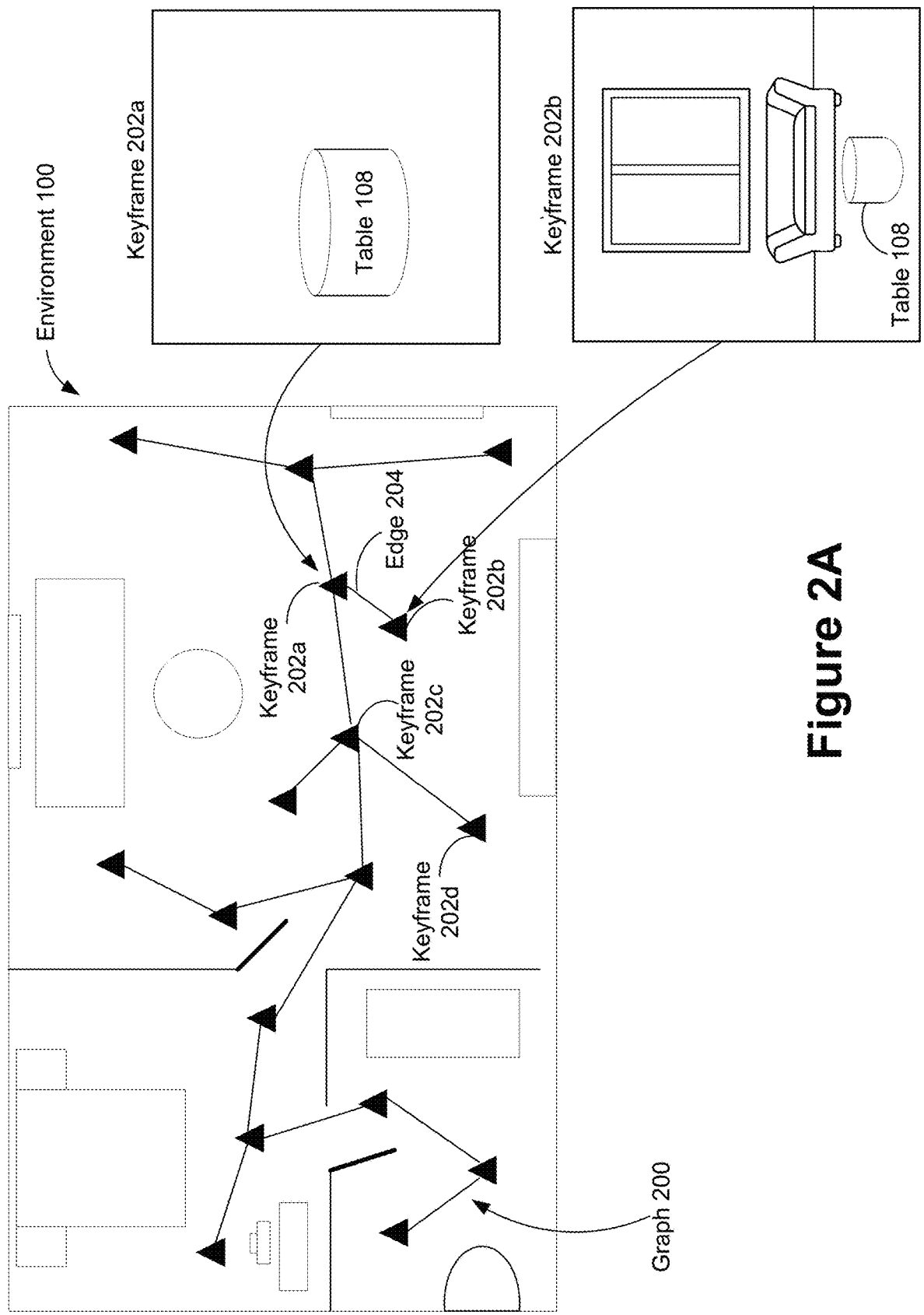
FIG. 2A is a schematic diagram of a co-visibility graph created in accordance with images captured from the vantage point of a mobile robot navigating in an environment in accordance with some embodiments.
Figure 2B:
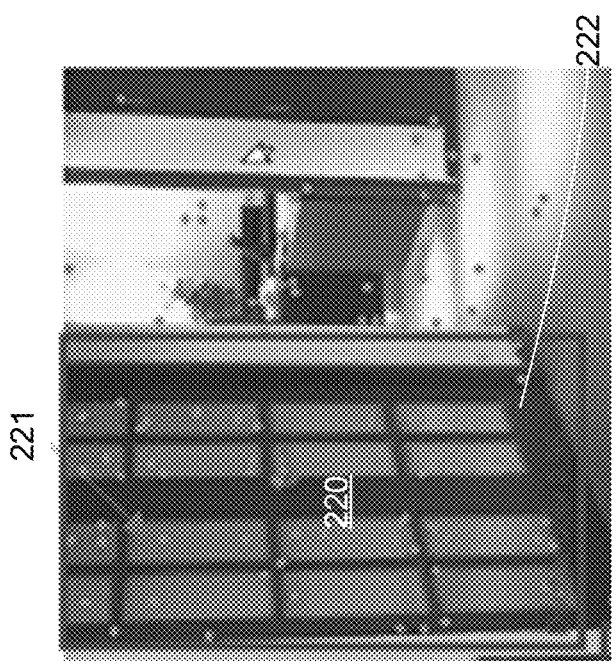
FIG. 2B shows an example image frame marked with extracted key points, in accordance with some embodiments.

FIG. 2A is a schematic diagram of a graph 200 created in accordance with images captured from the vantage points of a mobile robot navigating in the environment 100 (e.g., by the on-board cameras of the mobile robot) in accordance with some embodiments.

In some embodiments, the mobile robot 102 estimates a map of the environment 100 using only selected frames (also known as "keyframes") that are significant for the features contained therein instead of indiscriminately using continuously captures frames (e.g., images from even intervals of a video of the environment). In this keyframe-based approach, the mobile robot 102 travels through the environment 100 and builds a graph by capturing images (e.g., keyframes) of different portions of environment 100 and connecting the keyframes based on pre-established criteria. The keyframes are stored within the system and contain informational cues for localization. For example, a keyframe may store information of transform point from world coordinates to camera coordinates, the camera's intrinsic parameters (e.g., focal lengths and principal points), and all the features (points, lines or planes) in the camera images, in some embodiments. FIG. 2A shows the graph 200 superimposed on a layout of the environment 100. The graph 200 includes a plurality of nodes (e.g., represented by the black triangles in FIG. 2A)

corresponding to keyframes (e.g., keyframes 202a-202d, etc.). The respective location of a node in the environment 100 indicates the location at which the keyframe corresponding to the node was captured. An edge connecting two keyframes (e.g., edge 204 connecting keyframes 202a and 202b (or the corresponding nodes of the keyframes 202a and 202b in FIG. 2A)) indicates that the two keyframes share at least a threshold number of map points in the environment 100. A map point is a point in the 3D space that is associated with a plurality of keyframes (e.g., captured in a plurality of keyframes, correspond to the same object captured in a plurality of keyframes, etc.). For example, a map point stores information such as a 3D position in world coordinate system, a viewing direction, descriptors, max and min distances where observed, etc. For example, the keyframe 202a is connected to the keyframe 202b by the edge 204 because these two keyframes share certain map points (e.g., map points that correspond to the table 108 that are captured in both keyframes 202a and 202b). In another example, keyframe 202a and keyframe 202d are not directly connected by an edge, indicating that the overlap of the two keyframes is low (e.g., they are captured at locations in the environment 100 that are too far away, or pointing at different portions of the environment, etc.). In some embodiments, the graph 200 is a co-visibility graph. The co-visibility graph is a graph that includes keyframes as nodes and edges between keyframes indicating that which pairs of keyframes have at least a threshold number of common map points between them (e.g., are more likely to capture the same portion of the environment, or capture the same objects corresponding to a respective functionality, etc.). In some embodiments, each object (e.g., the table 108) is associated with multiple map points on a keyframe. As shown in FIG. 2A, the same object may appear with different sizes and positions in different keyframes and has different surrounding objects in different keyframes (e.g., table 108 in keyframes 202a and 202b), but at least a significant number of the map points corresponding to the table 108 can be recognized from both keyframes and linking the keyframes to one another in the co-visibility graph, in accordance with some embodiments.

FIG. 2C shows example performance metrics, in accordance with some embodiments. A table 230 in FIG. 2C summarizes the performance metrics of the methods described herein. The second column in the table shown in FIG. 2C shows performance metrics associated with conventional ORB-VSLAM 2 system that extracts 1400 features per frame. The third column in the table shows performance metrics associated with the methods described herein that extract 1400 features per frame. The fourth column in the table shows performance metrics associated with conventional ORB-VSLAM 2 system that extracts 2000 features per frame. The last column in the table shows performance metrics associated with the methods described herein that also extract 2000 features per frame. Initialization time, shown in seconds are compared for each of these four different cases.

The initialization time shown for ORB VSLAM 2 (A) and ORB VSLAM 2 (B) begins at the moment the mobile robot starts moving. When 1400 features are extracted per frame, conventional ORB VSLAM 2 (A) takes about 10.7 seconds to complete initialization. When 2000 features are extracted per frame, conventional ORB VSLAM 2 (B) takes about 9.3 seconds to complete initialization. The methods and systems described herein begins initialization only after friendly motion has been detected. Depending on the type of terrain the mobile robot traverses in, the time between the mobile robot starts moving to the time friendly motion is detected may be about 3-4 seconds, in some embodiments. Once friendly motion has been detected, the methods described herein completes initialization in about 0.38 second when 1400 features are extracted per frame, and about 0.39 seconds when 2000 features are extracted per frame.

Initialization success rate measures the ability of the mobile robot to continue tracking key points (e.g., key point corresponding to a corner of the bookshelf 220) across subsequent frames captured by the monocular camera (e.g., a "tracking" condition) using the initial map generated from the initialization process. The "tracking" condition corresponds to an internal state used in the localization algorithm to describe if a new frame has been successfully referenced to a previous frame or keyframe. If a new frame cannot be referenced to any of the previous frames or keyframes, the state will be updated as "lost," (e.g., not tracking). When the mobile robot is not able to track key points across subsequent frames (e.g., a "lost" condition), initialization is deemed to have failed, and the mobile robot is reset, for example, by repeating the initialization process again to generate a new map (e.g., reinitialization, relocalization). When 1400 features are extracted per frame, conventional ORB VSLAM 2 (A) has an initialization success rate of 92%. When 2000 features are extracted per frame, conventional ORB VSLAM 2 (B) has an initialization success rate of 97%. Extracting more features per frame (e.g., in ORB VSLAM 2 (B)) provides more possible key points to be tracked across subsequent frames, and increases the initialization success rate of ORB VSLAM 2 (B). The methods described herein achieve 100% initialization success rate when either 1400 features or 2000 features are extracted per frame.

ORB-VSLAM 2 is based on multiple 3D reconstruction model fitting, and a heuristic method is used to choose a suitable 3D reconstruction model. ORB-VSLAM also heavily employs RANSAC scheme, which may lead to cause randomness. Heuristic methods to are also used in ORB-VSLAM 2 to resolve ambiguities of 3D reconstruction.

Like ORB-VSLAM 2, tightly-coupled VIO methods also begins initialization once the mobile robot starts moving. Tightly-coupled VIO methods involve a complex algorithm that tightly couples IMU poses and visual features and uses non-linear optimization for every frame. As a result, multiple optimization iterations (e.g., one for each frame) are performed for a single initialization process. In contrast, for the methods and systems described herein, only a single optimization step is used at the end of the initialization process. The methods and systems described herein use an IMU to detect friendly motion, and uses a simple algorithm based on consistency checking between extracted visual features and IMU pose to determine if a particular image frame is to be used for initialization. No 3D reconstruction model fitting, no RANSAC, and no heuristic hypothesis selection is used.

Figure 3A:
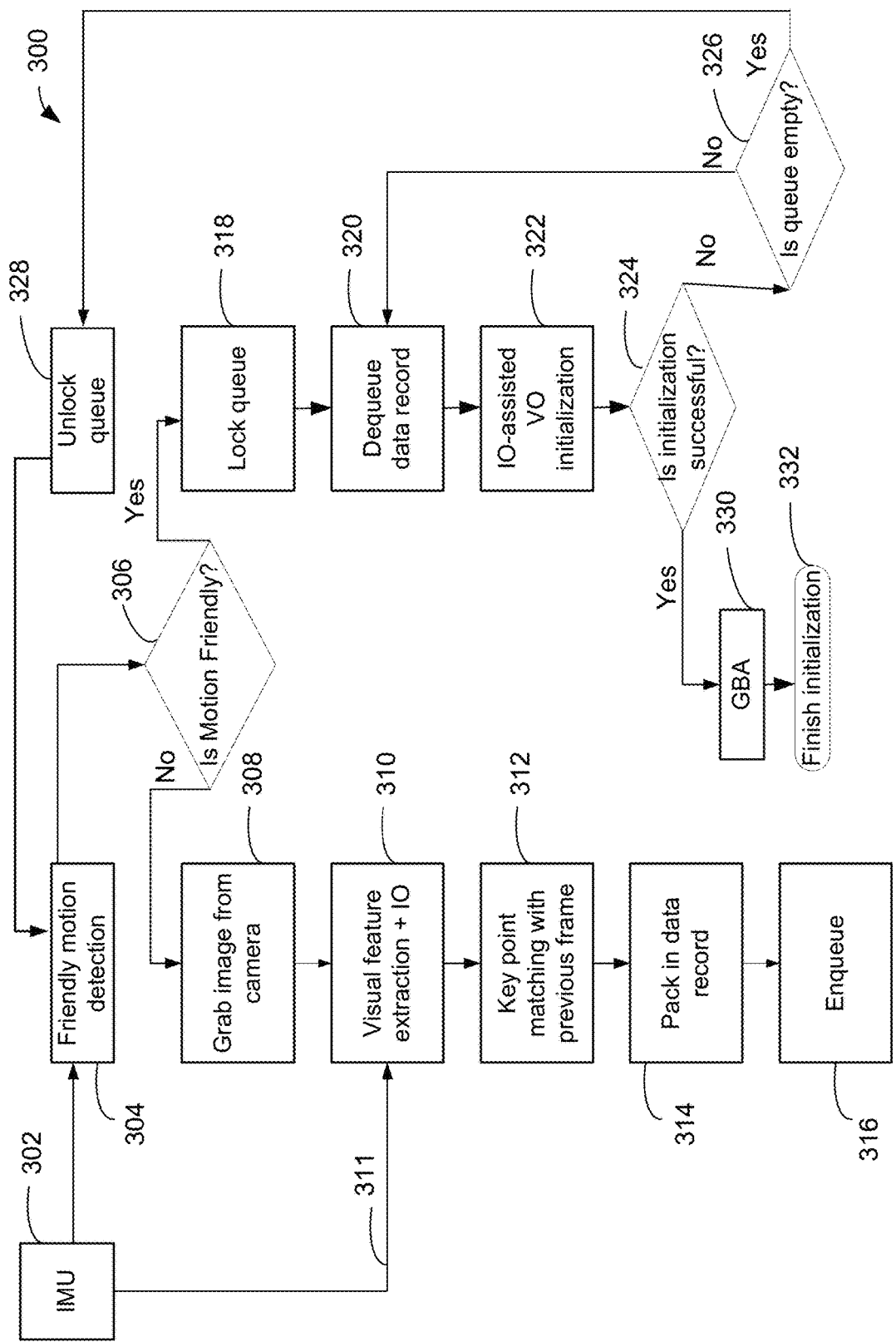
FIG. 3A shows a system overview, in accordance with some embodiments.

FIG. 3A shows a system overview, in accordance with some embodiments. A system 300 includes an IMU unit 302. A mobile robot having the system 300 is started (e.g., powered on) and begins moving. A friendly motion detection module 304 detects if the mobile robot is moving in a trajectory friendly to VO initialization (e.g., straight line motions, no zig-zag or U-turn motions). In some embodiments, to detect whether the mobile robot is undergoing straight line motions, the friendly-motion detection module 304 applies a moving window along the time axis and fits a straight line in space using the IO poses determined from the IMU 302 during the moving window. In some embodiments, applying a moving window along the time axis includes providing a storage buffer that matches a length of the moving window and storing the IO poses determined from the IMU at each time point within the moving window in the storage buffer. If a least square fitting associated with the straight line and the detected spatial data derived from the IO poses yields an error (e.g., a sum of all squared differences between each of the IO poses and a corresponding point on the fitted line) that is smaller than a certain threshold, the mobile robot is deemed to have undergone straight-line motions. The average speed and the average difference of angle between consecutive IO poses in the moving window are computed to determine if the robot is experiencing friendly motion (e.g., straight-line motion, no zig-zag or u-turn motion). The robot is deemed to be undergoing friendly motion when the average speed is larger than a pre-defined threshold and the average difference of angles is smaller than a pre-defined threshold. In some embodiments, the pre-defined threshold for the average speed is about 0.2 m/s (e.g., between 0.1 m/s to 0.3 m/s), and the pre-defined threshold for the average difference of angles is about 1.0° (e.g., between 0.5 to 3.0°), respectively.

At a processor of the system 300, a step 306 determines if the motion of the mobile robot is friendly based on the output of the friendly-motion detection. In some embodiments, the determination at the step 306 that the motion of the mobile robot is not friendly is made before the moving window is completely filled. For example, the moving window may be 5 seconds long and before the 5 second of data collection has elapsed, all the determination from the step 306 would return the result that no friendly-motion is detection (e.g., the motion of the mobile robot is not friendly). In accordance with a determination at the step 306 that the motion of the mobile robot is not friendly, the system 300 then grabs an image frame of the camera at a step 308.

A processor in the system 300 extracts visual features from the frame captured by the camera at a step 310. After that, the processor in the system 300 matches key points in the current frame with those in a previous frame using any key point matching methods, in a step 312. The step 312 can significantly speed up the initialization and tracking later on (e.g., in a process 350 described in FIG. 3B). The system 300 then creates a data record at a step 314 that contains: (i) the extracted visual feature(s) from the step 310, (ii) the key point matching results from the step 312, and (iii) the IO pose of the robot when the image is grabbed, as detected by the IMU 302 at a step 311. The system pushes the data record into a fixed-length queue at a step 316. The fixed-length queue has a length equivalent to the length of the moving window used in the friendly motion detection module 304. A fixed length queue is a queue which pops the first element (e.g., the oldest entry) whenever it is full. The extraction of visual features and matching of key points at the step 310 and the step 312 occur before the system 300 has determined that friendly motion has been detected, and saves computational time for the process 350 described in FIG. 3B.

In accordance with a determination at the step 306 that the motion of the mobile robot is friendly, the system 300 then locks the fixed length queue a step 318. No additional data records are introduced into the fixed length queue when it is locked. At a step 320, a data record is dequeued. In some embodiments, a first data record representing the earliest record data record in the fixed length queue is dequeued. The first data record serves as the reference. The system then dequeues the next data records one by one and attempts to perform an IO-assisted VO initialization at a step 322 until either the VO initialization succeeds (as determined at a step 324), or the queue is empty (as determined at a step 326). The criteria for determining whether VO initialization is deemed to have succeeded (e.g., by consistency checking) is described in further details below.

In accordance with a determination at the step 326 that the queue is not yet empty, the processor in the system 300 then returns to the step 320 to dequeue the next (e.g., the second, or subsequent data record). Otherwise, in accordance with the determination at the step 326 that the queue is empty, the processor in the system 300 returns to the step 328 to unlock the queue. Upon unlocking of the queue, the IMU 302 continues with friendly motion detection using the friendly motion detection module 304, which restarts the friendly motion detection process and start an enqueing process. A determination is made at the step 306 regarding whether the mobile robot is undergoing friendly motion.

In accordance with a determination at the step 324 that the initialization is successful, the processor of the system 300 performs a global bundle adjustment (GBA) at a step 330. GPA ensures that keyframes' poses and map points in the initial map are consistent by minimizing reprojection errors. Given a set of images depicting a number of 3D points from different viewpoints, bundle adjustment involves simultaneously refining the 3D coordinates describing the scene geometry, the parameters of the relative motion, and the optical characteristics of the camera employed to acquire the images, according to an optimality criterion involving the corresponding image projections of the points (e.g., of all the points). The GBA at the step 330 is able to provide some compensation to the scale of the VO pose determined from the monocular camera. The initialization is completed at a step 332 (e.g., an initial map is built), using the output of the GBA optimization procedure.

Figure 3B:
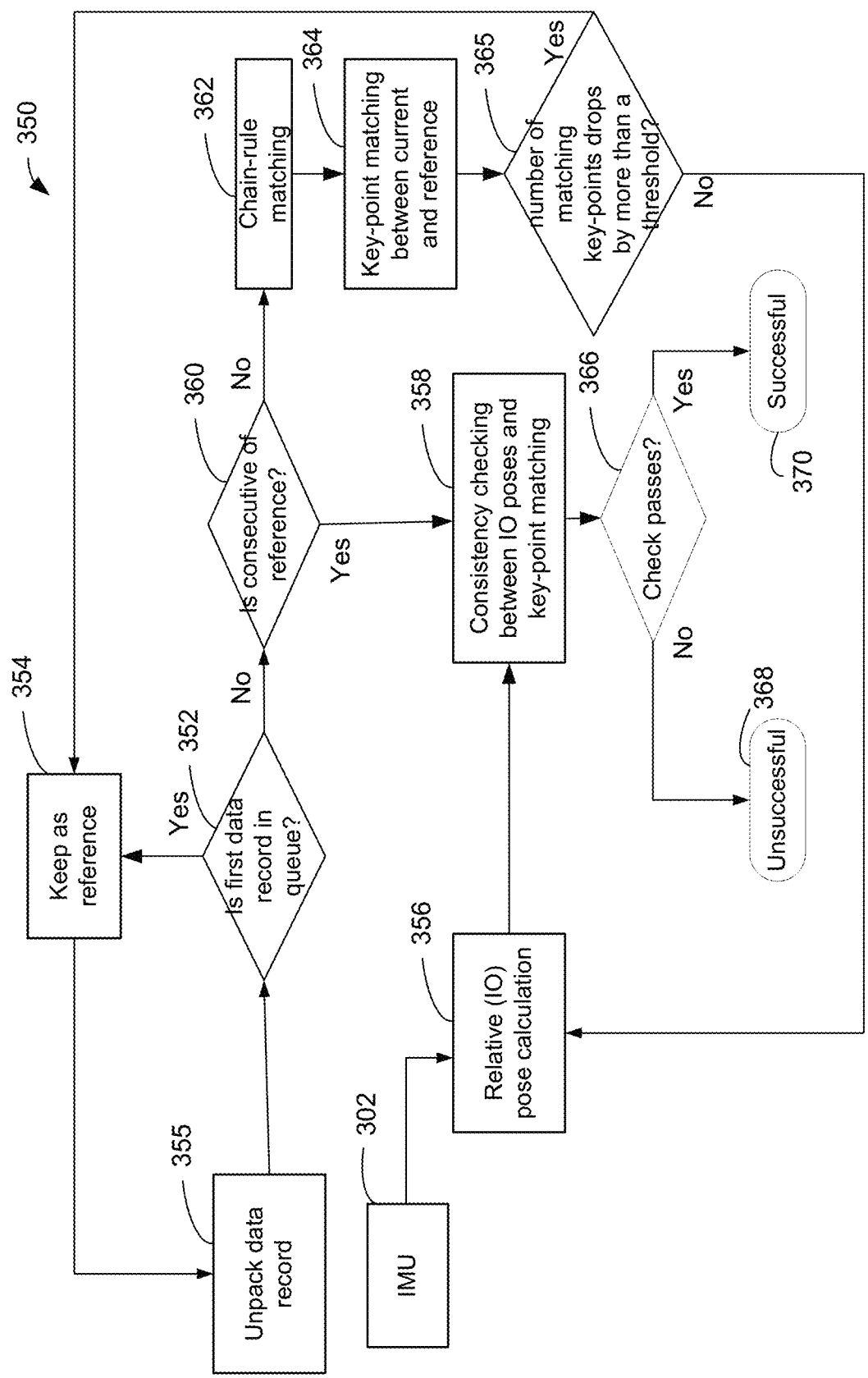
FIG. 3B illustrates an IO-assisted VO initialization process, in accordance with some embodiments.

FIG. 3B illustrates an IO-assisted VO initialization process, in accordance with some embodiments. An IO-assisted VO initialization process 350 begins with a determination at a step 352 whether a data record is the first data record in the queue. In accordance with a determination at the data record is the first data record in the queue, that first data record is kept as a reference data record at a step 354. The process unpacks a subsequent data record at a step 355 and returns to check at the step 352 if the subsequent data record is the first data record in the queue. Unpacking the subsequent data record at the step 355 includes retrieving the visual feature, initial matching with the previous frame, and corresponding IO pose from the data record.

Upon a determination that the latest dequeued data record (e.g., the "Current" data record) is not the first data record in the queue, the process 350 determines at a step 360 if the current data record is consecutive to the reference data record. A relative pose calculation of the current data record unpacked at the step 355 is calculated at a step 356. The relative pose is the change in pose between the reference data record (determined at the step 354) and the current data record. The relative IO pose of the camera $T_{c_{k-1}}^{c_k}$ between the current frame and the reference frame is calculated using the following equation:

$$T_{c_{k-1}}^{c_k} = T_{b_k}^{c_k} T_{b_{k-1}}^{b_k} T_{b_k}^{c_k} \qquad (1)$$

where T denotes a pose presented in the homogenous coordinate form, which can be decomposed in the following form:

$$T = \begin{bmatrix} R & P \\ 0 & 1 \end{bmatrix} \quad (2)$$

where R is a 3-by-3 rotation matrix, P is a 3-by-1 position vector, and 0 and 1 are scalars. Subscripts and superscripts such as $c_k$ and $b_k$ stand for camera frame and robot body frame of the $k^{th}$ image, respectively, and the superscript represents the reference frame. The subscripts and superscripts describe how the frames are related spatially and which frame is treated as the reference as the other, but does not necessarily follow a temporal order. For example, for the $k^{th}$ image and the $(k-1)^{th}$ image, their relative poses can be described in either order (e.g., $$T^{c_k}_{c_{k-1}} \text{ and } T^{c_{k-1}}_{c_k}$$

using either one of the frames as the reference. For instance, $$T^{c_k}_{c_{k-1}}$$

denotes the pose of camera name at $(k-1)^{th}$ image referenced to the pose of camera frame at the $k^{th}$ image.

In some embodiments, for ground mobile robots, VO poses are assumed to have z-coordinate=0 to simplify computations involved in initialization. In some embodiments, for a mobile robot having constrained motions, for example, a robot cleaner that only moves forward or turns on the ground, the normalized $$T^{c_k}_{c_{k-1}}$$

can be replaced with $$\begin{vmatrix} 1 & 0 & 0 & 1 \\ 0 & 1 & 0 & 0 \\ 0 & 0 & 1 & 0 \\ 0 & 0 & 0 & 1 \end{vmatrix}$$

to simplify the implementation, where the last column is a primitive vector, assuming the mobile robot is heading along the x direction.

In some embodiments, the relative pose between camera and robot center remains constant, therefore $T^{c_k}_{b_k}$ (e.g., known also as the camera's extrinsic parameters) is time-invariant and can be calibrated beforehand. Hence, given the relative pose measured by the IO between different images, $$T^{c_k}_{b_{k-1}},$$

the corresponding relative camera pose, $$T^{c_k}_{c_{k-1}}$$

can be calculated as described above regardless of the mounting of the camera as long as the extrinsic parameters are calibrated. When the IMU 302 is mounted at the center of the robot body or the "robot center," the measurements recorded by the IMU 302 would coincide with the measurements about robot center. When the IMU 302 is mounted away from the robot center, a coordinate transformation of the measurements recorded by the IMU 302 transforms the IMU measurement into data relating to the robot center. Once again, the coordinate transformation is time-invariant (e.g., assuming no change in the IMU position after it has been mounted to the mobile robot) and can be calibrated before operating the mobile robot.

The translation vector of $$P^{c_k}_{c_{k-1}}$$

may be normalized to nave norm of 1, which may help the method be less dependent on different environments. Due to the use of a monocular camera, the translation vector $$P^{c_k}_{c_{k-1}}$$

does not include an absolute scale that correlates the $$P^{c_k}_{c_{k-1}}$$

to the real world coordinate system. As explained below, the GBA procedure at the step 330 helps to provide a partially corrected pose information that do not significantly differ from the pose in which the scale is compensated (e.g., fully compensated) for.

In accordance with a determination at the step 360 that the current data record is neither the reference nor the consecutive record of the reference, a matching chain rule is applied at a step 362 to quickly match key points in the current frame associated with the current data record with the reference frame.

Figure 4:
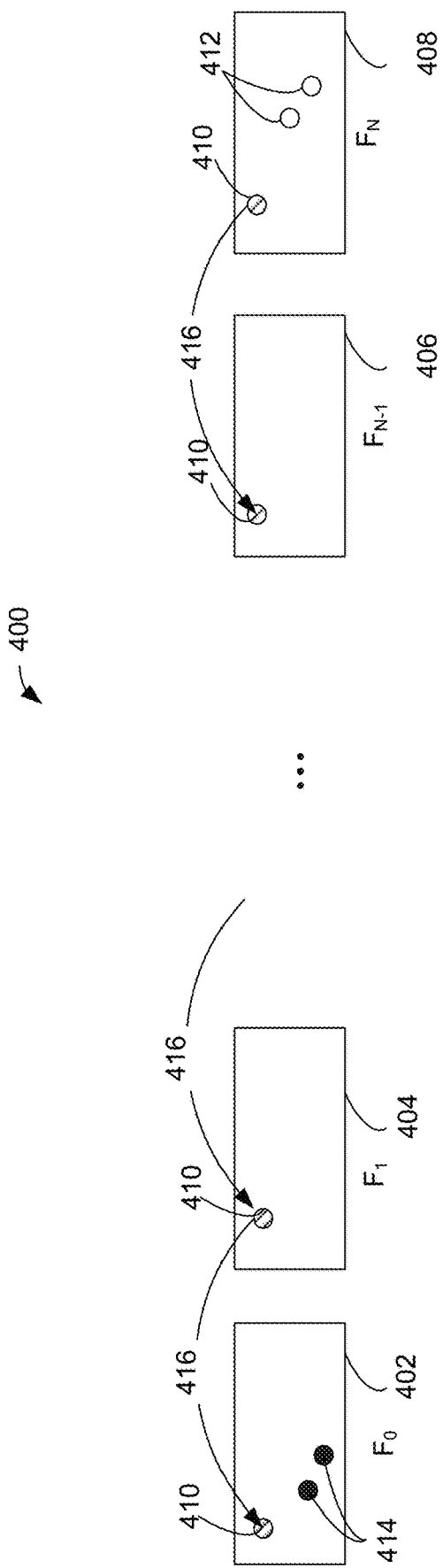
FIG. 4 shows an example method of matching key points across different frames, in accordance with some embodiments.

FIG. 4 shows an example method of matching key points across different frames, in accordance with some embodiments. A method 400 includes using a matching chain rule algorithm for matching key points across one or more different image frames. For a sequence of N frames, included a reference frame 402 ($F_0$), an adjacent frame 404, $F_1$, frame 406 $F_{N-1}$, and the last frame 408 $F_N$, a key point 410 (shown as a circle with dashed line) can be chain matched (as shown by arrows 416) from the last frame 408 $F_N$ through the adjacent frame 406 $F_{N-1}$, to the reference frame 402, $F_0$. For the remaining key points that cannot be matched using the chain rule (e.g., key points 412 represented by unfilled circles in the last frame 408 $F_N$, and key points 414 represented by solid circles in the reference frame 402 $F_0$), the process 350 uses a key point matching method to match the remaining key points at a step 364. In some embodiments, the computer system first checks for objects that are already registered from a previous keyframe-if the object that is detected in the current keyframe has a same category label as the object that is detected in the previous keyframe (e.g., both keyframes show the object as a "chair") and bounding boxes surrounding the two detected objects of the two keyframes are within a threshold distance of each other in the environment (the bounding box indicates regions of the keyframe where an object is located and have corresponding locations in the environment), the computer system associates the two detected objects with the same object ID (e.g., the computer system considers the two detected objects to be the same object in the environment). If the computer system is not able to re-identify the detected object from a previous keyframe, the computer system then searches for detected objects with the same category label in that can be seen from the field of view (FOV) of the current frame.

In some embodiments, the chain rule matching helps to significantly reduce the number of key points that are matched using the key point matching method, and thus helps to reduce computation.

At a step 365, a determination is made whether a number of matching key points has dropped below a first threshold percentage. In accordance with a determination that a number of matching key points between the $N^{th}$ frame and the reference frame 402 ($F_0$) drops by more than a first threshold percentage compared with the number of matching points between the reference frame 402 ($F_0$), and its adjacent frame 404, $F_1$, (e.g., the "Yes" branch) the process 350 sets the current data record as the reference (e.g., returns to the step 354) and repeats the steps 355, 356, 360, 362, 364. The process of replacing the reference frame is further illustrated in scenario B shown in FIG. 5. In some embodiments, the first threshold is less than or equal to 40% (e.g., 35%, 30%, 25%, 20%).

In accordance with a determination that the number of matching key-points does not drop by more than the first threshold percentage, indicating that there is a sufficient number of matching key points between the $N^{th}$ frame and the reference frame 402 ($F_0$) (e.g., the "No" branch), the relative pose calculation is calculated at the step 356.

In accordance with a determination at the step 360 that the current data record is consecutive to the reference data record (e.g., the adjacent frame 404, $F_1$), or in accordance with a determination that the key-point matching between current data record and the reference data record does not drop by more than the first threshold percentage, the process 350 conducts a consistency check between the IO poses and the key-point matching at a step 358. The step 358 follows immediately from the "Yes" determination of the step 360 results from the initial pre-processing at the step 312 in FIG. 3A that was performed while the moving window was collecting enough data frames to determine if there is friendly motion. As a result, no key-point matching needs to be done for the frame adjacent to the reference frame, speeding up the initialization process once friendly motion has been detected.

Consistency checking at the step 358 includes comparing the relative pose $T_{c_{k-1}}^{c_k}$ determined using Equation 1 above, and the key point matching of the VO derived imaged frames conducted at the step 312 in FIG. 3A (e.g., for frames adjacent to the reference frame) and/or the key point matching conducted at the step 364 in FIG. 3B (e.g., for frames not adjacent to the reference frame). In some embodiments, the scale and VO-to-IO pose transformation are performed after the VO initialization is successful (at a step 370). As a result, neither the scale nor the VO-to-IO pose transformation is available during consistency checking at the step 358. Thus, the direction of the translation of the relative VO pose to that of the relative VO pose converted from IO pose is compared as part of the consistency checking. In other words, the direction of the movement as measured by the camera is compared against the direction of the movement as measured by the IMU. If those two directions are aligned, then the VO pose is consistent with IO pose, in addition to the key-frame pointing in the step 358. As a result, even the scale is not available at the step 358, consistency checking at the step 358 checks whether both the camera and IMU sensors show that the robot is moving towards a particular direction (e.g., the forward direction), giving a higher confidence in determining whether the VO initialization is successful.

Processing time for each frame is mostly caused by the feature extraction and matching steps in the step 310 and the step 312 (e.g., of FIG. 3A). Since these steps have been pre-calculated before putting in the queue, process 350 can be executed very quickly. In some embodiments that include high computational systems (e.g., systems having high computational resources and capacity), all data records in the queue may be processed in real time. In some embodiments, if a camera captures 30 frames per second, a high computational resources and capacity system includes hardware (e.g., a CPU) that is capable of completing the initialization process within $\frac{1}{30}$ second, for the queue to be processed in real time. In some embodiments, for more complex systems, the dequeue process (e.g., the step 320 in FIG. 3A and subsequent processing using the process 350 shown in FIG. 3B) and the enqueue process (e.g., the step 316) can run in parallel in two different threads. A synchronization technique is used to then synchronize the two threads.

For low-cost systems with more limited computational resources, the length of the queue may be shortened to reduce the number of records. Shortening the queue may delay the initialization point compared to embodiments that adopt a longer queue, but such embodiments still confer advantages (e.g., faster and more accurate initialization) described here.

Figure 5:
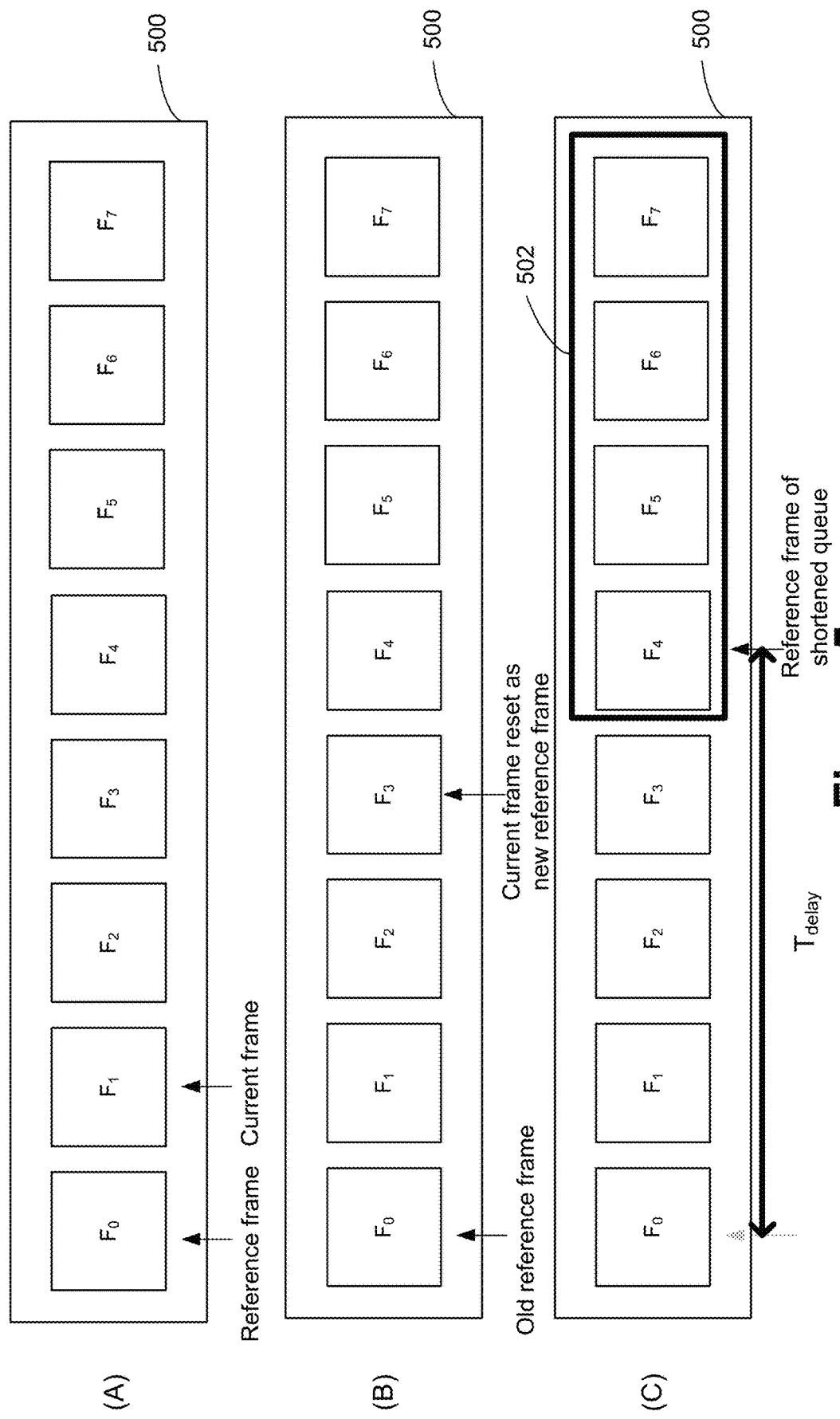
FIG. 5 shows a method of processing data records in accordance with some embodiments.

FIG. 5 shows a method of processing data records in accordance with some embodiments. FIG. 5 shows three different scenarios for processing of data records associated with various camera frames. All three scenarios are illustrated using a moving window 500 sufficient for storing eight frames of images captured by the monocular camera (e.g., during the friendly motion detection stage of operation). The length of time associated with the moving window 500 may be, for example, between 2-5 seconds. Once the moving window 500 is filled, and a linear line fit to the IMU poses corresponding to each of the frames captured has an error that is less than a threshold, the system 300 determines the mobile robot is undergoing friendly motion. The queue is locked (e.g., step 318 in FIG. 3A), and no new data is added to the moving window 500.

In the first scenario (A), F0 the first frame in the window moving is set as the reference frame, and the adjacent frame $F_1$ is set as the current frame. If the data associated with $F_1$ is found to satisfy the consistency check (e.g., step 370 in FIG. 3B), an initial map is generated after the GBA step 330 in FIG. 3A, and the initialization concludes at the step 332 (e.g., subsequent frames $F_1$-$F_7$ are not used for generating the initial map).

If the consistency check (using the current frame F1) at the step 358 of the process 350 shown in FIG. 3B fails (e.g., the process 350 reaches the step 368 in FIG. 3B and reaches the determination step 326 in FIG. 3A), the next frame (F2)

is set as the new current frame, as the system 300 processes to repeat the step 320 shown in FIG. 3A using the next frame F2. If the process 350 proceeds to the last frame (e.g., F7) but the consistency check still fails, the system 300 then unlocks the queue at the step 328, clears all the data entries in the moving window 500, and resumes friendly motion detection using the friendly motion detection module 304.

In the second scenario (B), the current frame $F_3$ is no longer adjacent to the reference frame $F_0$. In accordance with a determination that the number of matching key points between the reference frame (e.g., $F_0$) and the current frame (e.g., $F_0$) drops by more than a threshold percentage (e.g., drop by about 40%, drops by about 30%) compared to the number of matching key points between the reference frame (e.g., $F_0$) and its adjacent frame (e.g., $F_1$), current frame is reset as the new reference frame, and the process 350 shown in FIG. 3B is repeated using the frames subsequent to the new reference frame (e.g., $F_4$-$F_7$). Resetting the reference frames help to ensure sufficient numbers of matching key points for better and more accurate initialization.

In the third scenario (C), even though the moving window 500 includes eight data entries, low-cost systems may have more limited computational resources, and the length of a queue 502 may be shortened to reduce the number of records (e.g., to four records from eight records). Shortening the queue may delay the initialization point compared to embodiments that adopt a longer queue, the time delay $T_{delay}$ associated with shortening the queue corresponds to the time for collecting the first four frames that are not used in the initialization process. For example, the fifth frame ($F_4$) is used as the reference frame for the shortened queue 502.

The relative pose $$T^{c_k}_{c_{k-1}}$$

is determined based on me relative pose $$T^{b_k}_{b_{k-1}}$$

calculated from integrating signals of the IMU 302. In some embodiments, when the IMU is not mounted at the center of the robot body, a coordinate transformation is used to transform the IMU pose (determined using signals obtained from the IMU) into the robot body pose $$T^{b_k}_{b_{k-1}}.$$

In some embodiments, the rotational matrix and translation vector determined from the relative IO pose $$T^{b_k}_{b_{k-1}}$$

(or the corresponding $$T^{c_k}_{c_{k-1}}$$

are used to transform a key point extracted from the VO data of the reference frame (e.g., $k^{th}$ frame) to its corresponding current frame (e.g., $(k+1)^{th}$ frame). The methods and systems described herein directly use $$T^{c_k}_{c_{k-1}}$$

instead of VO poses estimated using either the Fundamental or Essential matching model, providing a more accurate consistency check while reducing the amount of computation resources used. In addition, parallax between two frames (e.g., the reference frame and the current frame) is set at a first threshold of the parallex of all matching key points. In some embodiments, the first threshold is at least 70% (e.g., at least 80%, at least 85%), rather than at or below 50%.

Figure 6:
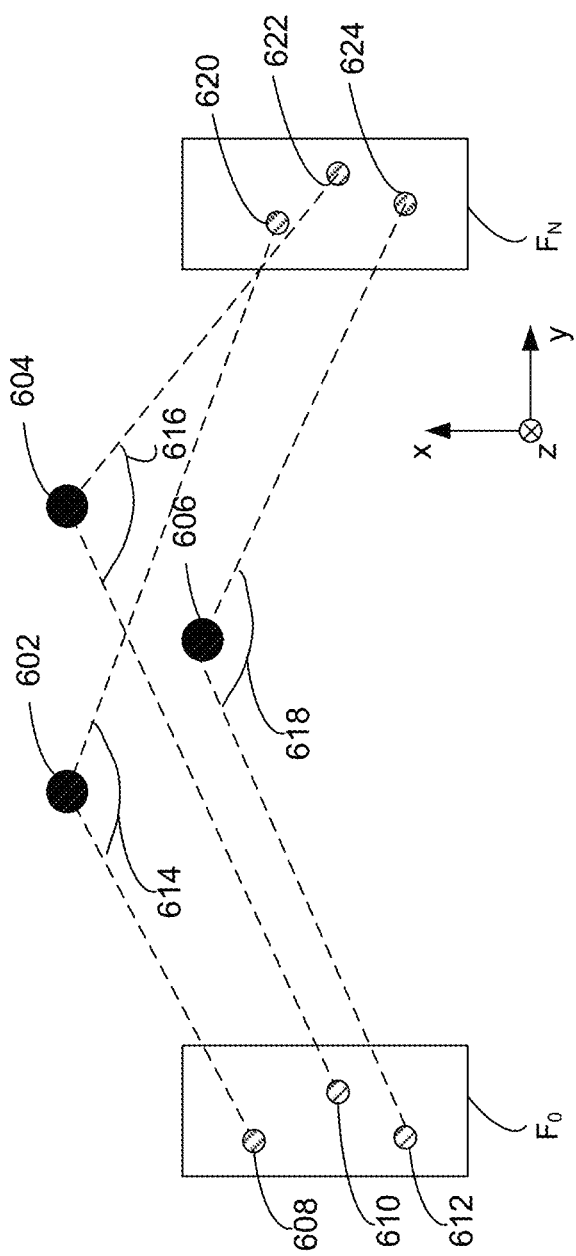
FIG. 6 shows parallax associated with different camera frames, in accordance with some embodiments.

FIG. 6 shows parallax associated with different camera frames, in accordance with some embodiments. A first real-world point 602, a second real-world point 604, and a third real-world point 606 are captured on the first frame $F_0$ (e.g., reference frame) as a first key point 608, a second key point 610, and a third key point 612, respectively. The first real-world point 602, the second real-world point 604, and the third real-world point 606 are also captured on the current frame $F_N$ (e.g., reference frame) as a first key point 620, a second key point 622, and a third key point 624, respectively. The locations of the first frame $F_0$ and the current frame $F_N$ in FIG. 6 schematically represents locations of the mobile robot when it is navigating along the x-y plane. A particular real-world point (e.g., 602, 604, or 606) is recorded as a key point in each of the two frames (e.g., $F_0$ and $F_N$). A pair of dotted lines connects each real-world point with its corresponding key points in each of the two frames. An angle between the pair of dotted lines corresponds to a key point parallax. The first real-world point 602, the second real-world point 604, and the third real-world point 606, correspond to a first key point parallax 614, a second key point parallax 616, a first key point parallax 618, respectively. In other words, each pair of matching key points between two frames has its own parallax (a "keypoint-parallax") which is calculated from the angle between the two rays that connect the corresponding 3D point (in 3D space) with these two key points.

A monocular camera captures frames of the real world scene (e.g., a single frame at each time point) to determine positions of real world features present in the scene. Triangulation methods use the two (or more) captured frames (e.g., $F_0$ and $F_N$) to calculate the position of the real world features (e.g., real-world points 602, 604, or 606). When the distance (e.g., along the y direction) between the two frames (e.g., $F_0$ and $F_N$) are too close, the parallax associated with the two frames would be too small and may not provide accurate triangulation results. Each pair of captured frames may have many different parallaxes corresponding to different key points. A global parallax of the two frames (a "frame-parallax") is to be determined based on all at least some one or more of the different keypoint-parallaxes associated with the two frames. In contrast to calculating all keypoint-parallaxes between two frames, ranking all the keypoint-parallaxes and selecting the 50th (not the 50th percentile) keypoint parallax as the frame-parallax, here all keypoint parallaxes are ranked, and 80% percentile value is selected as the frame parallax.

In some embodiments, a threshold parallax is set. In accordance with a determination that the parallax associated with the pair of frames (e.g., a reference frame and a current frame) is below the threshold parallax, the current frame is rejected as being too close to the reference frame, and a frame subsequent to the current frame is set as the new current frame.

In accordance with a determination at a step 366 that the key-point matching (e.g., for data derived from the monocular camera in VO) and the IO poses (e.g., from data measured by the IMU 302) meet a threshold for consistency checking (e.g., passes the check), the process 350 terminates with an "initialization successful" indication at a step 370. When the process 350 performs the step 370, the VO initialization succeeds. The system 300 then builds an initial VO map from reference and current data records. The initial VO map is built using IO poses as the keyframes' poses. In some embodiments, a keyframe is a frame selected according to certain criteria. A frame is a container designed to contain information related to a visual-SLAM algorithm (e.g., key feature points and their locations, and the pose of the frame, etc.) The pose of the frame is the position and orientation of the camera when the corresponding image is taken. In some embodiments, the barebone of a VO map is a set of keyframes, and the minimum number of keyframes to form a VO map is two. In some embodiments, the initial VO map is a set of keyframes generated by the algorithm during the initialization period. Using IO poses helps mitigate to some degree the scale mismatching between monocular VO poses and IO poses. Using the IO poses also transforms the VO map to the world coordinate system (e.g., the coordinate system defined by the body of the IMU 302 at the moment when the first IO pose is generated). The system then calls GBA to refine the coarse map. The VO initialization completes.

In accordance with a determination at the step 366 that the key-point matching (e.g., for data derived from the monocular camera in VO) and the IO poses (e.g., from data measured by the IMU 302) does not meet a threshold for consistency checking (e.g., fails the check), the process 350 terminates with an "initialization unsuccessful" indication at a step 368. If the consistency checking fails (e.g., the process 350 performs the step 368), and the queue is not empty, the system 300 will dequeue the next data record (e.g., the step 320 in FIG. 3A) and repeat the process 350. If the consistency check fails (e.g., the process 350 performs the step 368) and the queue is empty, the system 300 unlocks the queue at a step 328, as shown in FIG. 3A, and resumes the friendly motion detection using the friendly motion detection module 302.

The methods and systems described herein can be applied to any FM-VSLAM systems, which may be used in autonomous robots, augmented reality devices, and/or other autonomous driving devices. VSLAM estimates both a position of the robot and also builds a consistent map of the environment in which the robot is situated. In some embodiments, visual inertial odometry may not include maintaining a global (e.g., system) map that provides some understanding about the global environment. For example, the methods and systems described herein can be extended to Visual Inertial Odometry systems (e.g., to systems that do not include a global map)

Several features of the methods and systems described herein provide various advantages to the robustness and accuracy of the initialization process. First, delaying VO initialization until the motion is friendly (e.g., not shaking, no U-turn, or no zig-zag movements) helps to guarantee a good quality initial map. Second, the use of IMU data to detect friendly motion provides a good indication of the occurrence of friend motion. Third, the use of a fixed-length queue with length equivalent to the moving time window (e.g., 500 in FIG. 5) in friendly motion detection allows precalculated visual features (e.g., extracted features, the step 310 in FIG. 3A) and key point matching results (e.g., the step 312 in FIG. 3A) to be stored. Using the prestored values, chain-rule matching (e.g., the step 362 in FIG. 3B) can then be used to speed up the matching process (e.g., the step 364 in FIG. 3B). Fourth, conducting IO-assisted VO initialization by checking the consistency between relative IO pose and visual matching between reference and current frames (e.g., the step 358 in FIG. 3B) provides a convenient way to assess the suitability of a particular acquired frame to be used for the initialization process. Fifth, reference switching by monitoring the numbers of matching key points (e.g., scenario C in FIG. 5) helps to ensure a sufficient number of matching key points can be used to generate the initial map and to help ensure better tracking for subsequent frames. Sixth, using a percentile of key point parallax (e.g., 80%) to represent the parallax of the two frames that include many different parallax (e.g., FIG. 6). Seventh, use of IO poses as initial keyframe poses prior to the GBA step 330 in FIG. 3A. Using the IO poses as the initial keyframe helps to minimize errors due to the lack of scale information extracted from the monocular camera frames (e.g., lack of scale information in VO data from monocular camera)

Eighth, the solution to the relative pose can simplified by replacing the normalized $$T^{c_k}_{c_{k-1}}$$

with $$\begin{vmatrix} 1 & 0 & 0 & 1 \\ 0 & 1 & 0 & 0 \\ 0 & 0 & 1 & 0 \\ 0 & 0 & 0 & 1 \end{vmatrix}$$

in Equation (1) if the autonomous robots undergo constrained motions (e.g., robot cleaners).

Figure 7:
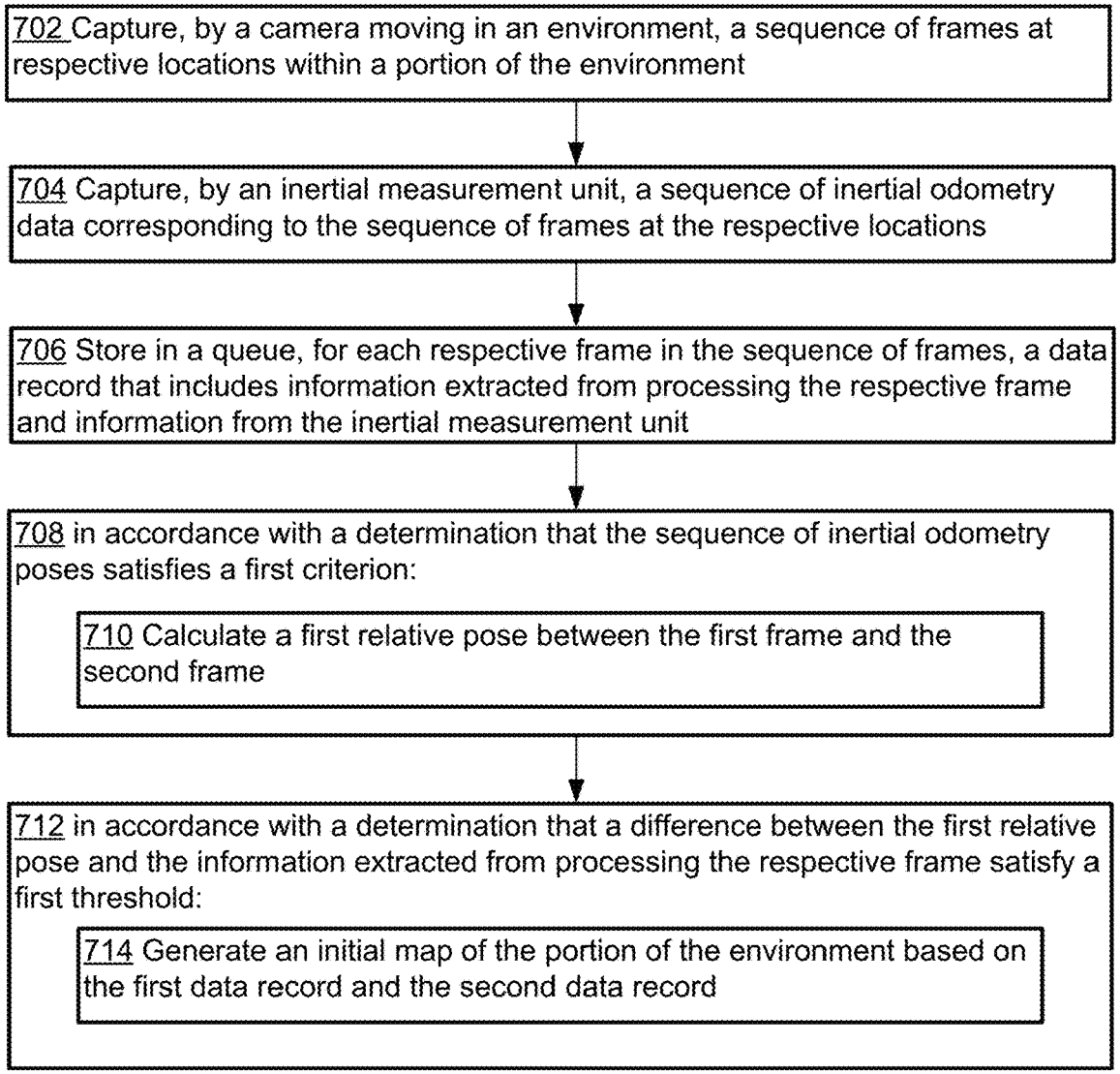
FIG. 7 illustrates an exemplary flowchart for a process of initializing a mobile robot in an environment in accordance with some embodiments.

FIG. 7 is a flow diagram illustrating an exemplary process 700 of localizing a mobile robot in an environment using a joint semantic and feature localization map in accordance with some embodiments. For convenience of description, the process is described as being implemented by a computer system, such as an onboard computer of the mobile robot 102, in accordance with some embodiments.

FIG. 7 illustrates an exemplary flowchart for a process 700 of initializing a mobile robot in an environment in accordance with some embodiments. The process 700 is optionally performed by the onboard processing units of the mobile robot, in accordance with some embodiments. In some embodiments, the process 700 is performed by a server in communication with the mobile robot. In some embodiments, the process 700 is performed jointly by the mobile robot and a server in communication with the mobile robot over a network. For ease of description, the steps of the process 700 are described with respect to a mobile robot, which is non-limiting and may be understood to be performed by the server or jointly by the mobile robot and the server, in accordance with various embodiments.

As the first step, the mobile robot captures (702), by a camera, a sequence of frames at respective locations within a portion of the environment, the sequence of frames includes a first frame and a second frame.

The mobile robot also captures (704) by an inertial measurement unit, a sequence of inertial odometry data corresponding to the sequence of frames at the respective locations. The mobile robot then stores (706), in a queue, for each respective frame in the sequence of frames, a data record that includes information extracted from processing the respective frame and information from the inertial measurement unit.

In accordance with a determination that the sequence of inertial odometry data satisfies a first criterion (708): the mobile robot calculates (710), a first relative pose between the first frame and the second frame. In accordance with a determination that that a difference between the first relative pose and the information extracted from processing the respective frame satisfy a first threshold (712): the mobile robot generates (714) an initial map of the portion of the environment based on the first data record and the second data record.

In some embodiments, the first relative pose between the first frame and the second frame is calculated based on inertial odometry data corresponding to the first frame and the second frame in the sequence of inertial odometry data. In some embodiments, the camera and the inertia measurement unit are mounted to a robot and determining whether the sequence of inertial odometry data satisfies a first criterion includes determining if the robot is moving along a trajectory that is conducive to generating the initial map. In some embodiments, the trajectory that is conducive to generating the initial map comprises a straight line. In some embodiments, the first criterion is satisfied when a straight line fit of the sequence of inertial odometry data has a least square fitting error that is smaller than a threshold. In some embodiments, the sequence of inertial odometry data for the straight line fit spans a duration corresponding to a first time window, and the queue having a same number of entries as a number of data points within the first time window. In some embodiments, the method further includes optimizing via a global bundle adjustment using the sequence of inertial odometry data as an initial pose for the global bundle adjustment, prior to generating the initial map.

In some embodiments, the difference between the first relative pose and the information extracted from processing the respective frame comprises a consistency check between key points extracted from the second frame, and a transformation of key points from the first frame based on the first relative pose.

Figure 8:
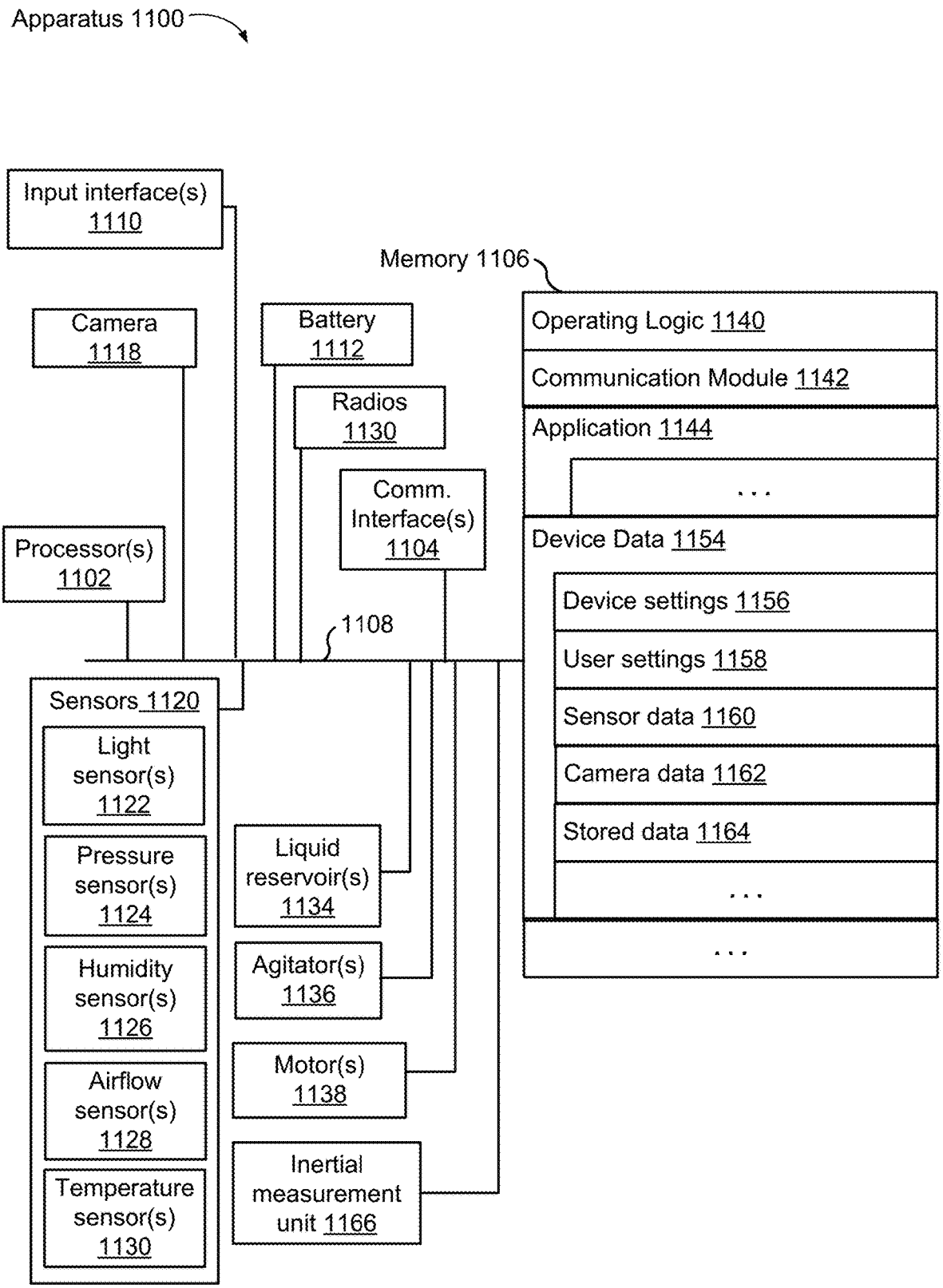
FIG. 8 is a block diagram of an electronic device that is configured to perform the methods described herein, in accordance with some embodiments.

FIG. 8 illustrates a block diagram of an apparatus 1100 in accordance with some embodiments. The apparatus 1100 includes a mobile robot 102, in some embodiments. In some embodiments, the apparatus 1100 includes a server in communication with the mobile robot. The apparatus 1100 is a representative of an electronic device that performs the process 1000 in FIG. 10, in accordance with some embodiments.

The apparatus 1100 includes one or more processor(s) 1102, one or more communication interface(s) 1104 (e.g., network interface(s)), memory 1106, and one or more communication buses 1108 for interconnecting these components (sometimes called a chipset).

In some embodiments, the apparatus 1100 includes input interface(s) 1110 that facilitates user input.

In some embodiments, the apparatus 1100 includes one or more camera 1118. In some embodiments, the camera 1118 is configured to capture images in color. In some embodiments, the camera 1118 is configured to capture images in black and white. In some embodiments, the camera 1118 captures images with depth information.

In some embodiments, the apparatus 1100 includes one or more inertial measurement units 1166. In some embodiments, the inertial measurement unit 1166 is configured to measure and report specific force, angular rate, and sometimes the orientation of the robot 102, using a combination of one or more of accelerometers, gyroscopes, and sometimes magnetometers.

In some embodiments, the apparatus 1100 includes a battery 1112. The apparatus 1100 also includes sensors 1120, such as light sensor(s) 1122, pressure sensor(s) 1124, humidity sensor(s) 1126, airflow sensor(s) 1128, and/or temperature sensor(s) 1130 to facilitate tasks and operations of the mobile robot (e.g., cleaning, delivery, etc.). In some embodiments, the apparatus 1100 also includes liquid reservoir(s) 1134, agitator(s) 1136, and/or motors 1138 to execute a cleaning task (e.g., sweeping, scrubbing, mopping, etc.).

In some embodiments, the apparatus 1100 includes radios 1130. The radios 1130 enable one or more communication networks, and allow the apparatus 1100 to communicate with other devices, such as a docking station, a remote control device, a server, etc. In some implementations, the radios 1130 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Ultrawide Band (UWB), software defined radio (SDR) etc.) custom or standard wired protocols (e.g., Ethernet, HomePlug, etc.), and/or any other suitable communication protocol, including communication protocols not yet developed as of the filing date of this document.

The memory 1106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 1106, optionally, includes one or more storage devices remotely located from one or more processor(s) 1102. The memory 1106, or alternatively the non-volatile memory within the memory 1106, includes a non-transitory computer-readable storage medium. In some implementations, the memory 1106, or the non-transitory computer-readable storage medium of the memory 1106, stores the following programs, modules, and data structures, or a subset or superset thereof:

- operating logic 1140 including procedures for handling various basic system services and for performing hardware dependent tasks;
- a communication module 1142 (e.g., a radio communication module) for connecting to and communicating with other network devices (e.g., a local network, such as a router that provides Internet connectivity, networked storage devices, network routing devices, server systems, and/or other connected devices etc.) coupled to one or more communication networks via the communication interface(s) 1104 (e.g., wired or wireless);
- application 1144 for performing tasks and self-locating, and for controlling one or more components of the apparatus 1100 and/or other connected devices in accordance with preset instructions.
- device data 1138 for the apparatus 1100, including but not limited to:

device settings 1156 for the apparatus 1100, such as default options for performing tasks; and user settings 1158 for performing tasks;

sensor data 1160 that are acquired (e.g., measured) from the sensors 1120;

camera data 1162 that are acquired from the camera 1118; and stored data 1164. For example, in some embodiments, the stored data 1164 include the semantic and feature maps of the environment, camera pose and map points of stored keyframes, etc. in accordance with some embodiments.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 1106 stores a subset of the modules and data structures identified above. Furthermore, the memory 1106 may store additional modules or data structures not described above. In some embodiments, a subset of the programs, modules, and/or data stored in the memory 1106 are stored on and/or executed by a server system, and/or by a mobile robot. Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first sensor could be termed a second sensor, and, similarly, a second sensor could be termed a first sensor, without departing from the scope of the various described implementations. The first sensor and the second sensor are both sensors, but they are not the same type of sensor.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated. The above clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

What is claimed is:

1. A method, comprising:

capturing, by a camera moving in an environment, a sequence of frames at respective locations within a portion of the environment, the sequence of frames includes a first frame and a second frame;

capturing, by an inertial measurement unit, a sequence of inertial odometry data corresponding to the sequence of frames at the respective locations;

storing in a queue, for each respective frame in the sequence of frames, a data record comprising information extracted from processing the respective frame and information from the inertial measurement unit;

in accordance with a determination that the sequence of inertial odometry data satisfies a first criterion, wherein the first criterion is satisfied when a straight line fit of the sequence of inertial odometry data has a least square fitting error that is smaller than a threshold and wherein the sequence of inertial odometry data for the straight line fit spans a duration corresponding to a first time window, and the queue has a same number of entries as a number of data points within the first time window:

calculating a first relative pose between the first frame and the second frame; and in accordance with a determination that a difference between the first relative pose and the information extracted from processing the respective frame satisfy a first threshold:

generating an initial map of the portion of the environment based on a first data record and a second data record, and wherein the camera and the inertial measurement unit are mounted to an autonomous robot and the first criterion is associated with determining if the autonomous robot is moving in a straight line trajectory before utilizing visual odometry (VO) initialization.

2. The method of claim 1, wherein the first relative pose between the first frame and the second frame is calculated based on inertial odometry data corresponding to the first frame and the second frame in the sequence of inertial odometry data.

3. The method of claim 1, wherein the camera and the inertial measurement unit are mounted to a robot and determining whether the sequence of inertial odometry data satisfies a first criterion comprises determining if the robot is moving along a trajectory that is conducive to generating the initial map.

4. The method of claim 3, wherein the trajectory that is conducive to generating the initial map comprises a straight line.

5. The method of claim 1, further comprising optimizing via a global bundle adjustment using the sequence of inertial odometry data as an initial pose for the global bundle adjustment, prior to generating the initial map.

6. The method of claim 1, wherein the difference between the first relative pose and the information extracted from processing the respective frame comprises a consistency check between key points extracted from the second frame, and a transformation of key points from the first frame based on the first relative pose.

7. An electronic device, comprising:
one or more processing units;
memory; and
a plurality of programs stored in the memory that, when executed by the one or more processing units, cause the one or more processing units to perform operations comprising:
capturing, by a camera moving in an environment, a sequence of frames at respective locations within a portion of the environment, the sequence of frames includes a first frame and a second frame;
capturing, by an inertial measurement unit, a sequence of inertial odometry data corresponding to the sequence of frames at the respective locations;
storing in a queue, for each respective frame in the sequence of frames, a data record comprising information extracted from processing the respective frame and information from the inertial measurement unit;
in accordance with a determination that the sequence of inertial odometry data satisfies a first criterion, wherein the first criterion is satisfied when a straight line fit of the sequence of inertial odometry data has a least square fitting error that is smaller than a threshold and wherein the sequence of inertial odometry data for the straight line fit spans a duration corresponding to a first time window, and the queue has a same number of entries as a number of data points within the first time window:
calculating a first relative pose between the first frame and the second frame; and in accordance with a determination that a difference between the first relative pose and the information extracted from processing the respective frame satisfy a first threshold:
generating an initial map of the portion of the environment based on a first data record and a second data record, and wherein the camera and the inertial measurement unit are mounted to an autonomous robot and the first criterion is associated with determining if the autonomous robot is moving in a straight line trajectory before utilizing visual odometry (VO) initialization.

8. The electronic device of claim 7, wherein the first relative pose between the first frame and the second frame is calculated based on inertial odometry data corresponding to the first frame and the second frame in the sequence of inertial odometry data to determine if the electronic device is in a trajectory that is conducive to generating the initial map.

9. The electronic device of claim 8, wherein the trajectory that is conducive to generating the initial map comprises a straight line.

10. The electronic device of claim 7, further comprising optimizing via a global bundle adjustment using the sequence of inertial odometry data as an initial pose for the global bundle adjustment, prior to generating the initial map.

11. The electronic device of claim 7, wherein the difference between the first relative pose and the information extracted from processing the respective frame comprises a consistency check between key points extracted from the second frame, and a transformation of key points from the first frame based on the first relative pose.

12. A non-transitory computer readable storage medium storing a plurality of programs for execution by an electronic device having one or more processing units, wherein the plurality of programs, when executed by the one or more processing units, cause the processing units to perform operations comprising:
capturing, by a camera moving in an environment, a sequence of frames at respective locations within a portion of the environment, the sequence of frames includes a first frame and a second frame;
capturing, by an inertial measurement unit, a sequence of inertial odometry data corresponding to the sequence of frames at the respective locations;
storing in a queue, for each respective frame in the sequence of frames, a data record comprising information extracted from processing the respective frame and information from the inertial measurement unit;
in accordance with a determination that the sequence of inertial odometry data satisfies a first criterion, wherein the first criterion is satisfied when a straight line fit of the sequence of inertial odometry data has a least square fitting error that is smaller than a threshold and wherein the sequence of inertial odometry data for the straight line fit spans a duration corresponding to a first time window, and the queue has a same number of entries as a number of data points within the first time window:
calculating a first relative pose between the first frame and the second frame; and in accordance with a determination that a difference between the first relative pose and the information extracted from processing the respective frame satisfy a first threshold:
generating an initial map of the portion of the environment based on a first data record and a second data record, and wherein the camera and the inertial measurement unit are mounted to an autonomous robot and the first criterion is associated with determining if the autonomous robot is moving in a straight line trajectory before utilizing visual odometry (VO) initialization.

13. The non-transitory computer readable storage medium of claim 12, the first relative pose between the first frame and the second frame is calculated based on inertial odometry data corresponding to the first frame and the second frame in the sequence of inertial odometry data.

14. The non-transitory computer readable storage medium of claim 12, wherein the difference between the first relative pose and the information extracted from processing the respective frame comprises a consistency check between key points extracted from the second frame, and a transformation of key points from the first frame based on the first relative pose.

15. The non-transitory computer readable storage medium of claim 12, wherein the plurality of programs, when executed by the one or more processing units, cause the processing units to perform operations further comprising optimizing via a global bundle adjustment using the sequence of inertial odometry data as an initial pose for the global bundle adjustment, prior to generating the initial map.

16. The non-transitory computer readable storage medium of claim 12, wherein the first relative pose between the first frame and the second frame is calculated based on inertial odometry data corresponding to the first frame and the second frame in the sequence of inertial odometry data to determine if the electronic device is in a trajectory that is conducive to generating the initial map.

* * * * *